(No Model.)

J. A. THREEHOUSE.
FENCE WIRE JOINING DEVICE.

No. 581,443.  Patented Apr. 27, 1897.

Witnesses:
D. M. Hulbert
Otto H. Barthel

Inventor
John A. Threehouse
By Sprague & Son
Attys.

THE NORRIS PETERS CO., PHOTO-LITHO., WASHINGTON, D. C.

UNITED STATES PATENT OFFICE.

JOHN A. THREEHOUSE, OF MAYVILLE, MICHIGAN.

FENCE-WIRE-JOINING DEVICE.

SPECIFICATION forming part of Letters Patent No. 581,443, dated April 27, 1897.

Application filed September 5, 1896. Serial No. 604,953. (No model.)

*To all whom it may concern:*

Be it known that I, JOHN A. THREEHOUSE, a citizen of the United States, residing at Mayville, in the county of Tuscola and State of Michigan, have invented certain new and useful Improvements in Weaving Devices for Wire Fences, of which the following is a specification, reference being had therein to the accompanying drawings.

The invention consists in the construction of a fence-machine designed to be used in weaving in fence-stays upon the longitudinal fence-wires for the purpose of making wire fences; and it consists of a frame, which is the handle of the device, carrying a twister-wheel at one end, gear for driving the twister-wheel, and a forked bearing extending from the handle beside the twister-wheel to engage with the fence-wire.

The invention further consists in the construction of the device so that it may be used for "spooling" the wire as well as for attaching the "spooled" stays to the fence, and, further, in the construction, arrangement, and combination of the various parts, all as more fully hereinafter described.

Figure 1:
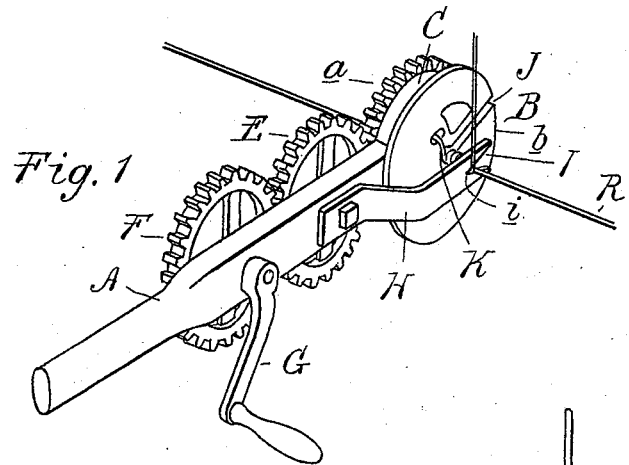
Figure 2:
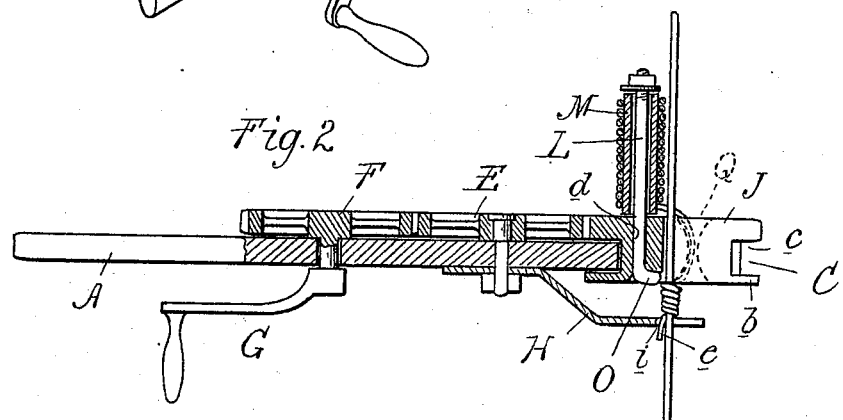
Figure 3:
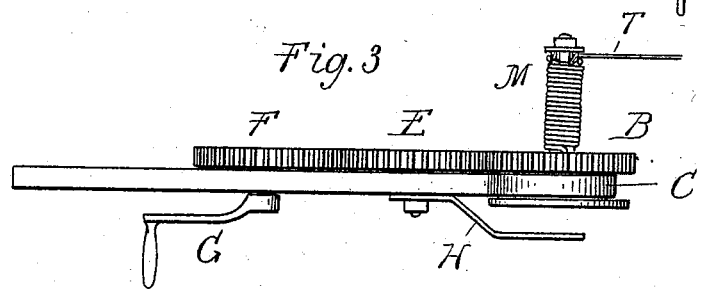
Figure 4:
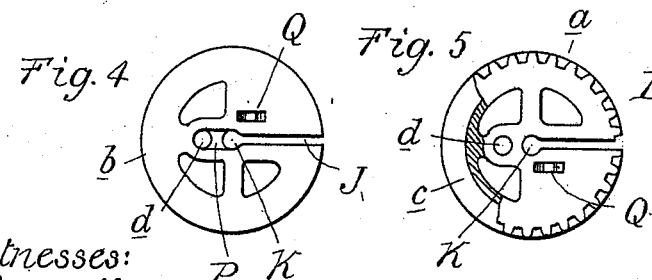
Figure 5:
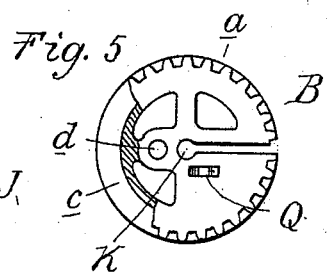

In the drawings, Figure 1 is a perspective view of my machine, showing it as in use in attaching the stays to a fence. Fig. 2 is a horizontal section through the machine. Fig. 3 is a plan view thereof, showing it as in use for spooling; and Figs. 4 and 5 are elevations of the two sides of the twister-wheel.

A is a bearing or frame which I shall refer to herein as the "handle," as the operator holds the device and moves it thereby.

B is a wheel which on its periphery is formed with the toothed flange $a$ and the flange $b$, the two being separated by a groove $c$, in which engages the yoke or eye C, formed at the end of the handle A, this wheel being what I call the "twister-wheel," being thus journaled in the end of the handle.

E and F are gear-wheels, the latter being provided with a crank G, by means of which the gear-wheels and the twister-wheel may be rotated in their bearings.

H is a bent arm extending from the handle A forwardly beside the twister-wheel and having the bifurcation I at its outer end.

The twister-wheel is provided with an entering-slot J, which leads to the central aperture or eye K.

$d$ is an aperture eccentrically arranged in the twister-wheel, through which a hooked bolt L engages. This bolt preferably clamps on the sleeve or spool M, although, if desired, a bolt or pin without the sleeve may be used. The hook O at the inner end of the bolt engages in a groove P, which extends from the central aperture K to the aperture $d$ upon one face of the twister-wheel. This hook simply has the function of turning the bolt L in its bearing. The bolt L may be engaged through the aperture K, if desired, as shown in Fig. 3, for the purpose hereinafter explained.

Q is a tapering bearing or aperture eccentrically arranged through the twister-wheel.

In the use of my device, the fence-wires R being strung up in the usual manner, the operator first spools the wire, that is, forms a series of spiral coils. This is done by arranging the bolt L in the central aperture K, with a sleeve or spool L clamped in position, as shown in Fig. 3, the handle being preferably secured to any stationary thing, such, for instance, as a post, and the stay-wires T are then coiled upon the spool, being cut off the desired length and laid to one side. The spool or pin is then adjusted in the eccentric aperture $d$, as shown in Fig. 2, and one of the spools of wire engages over the spool or pin with the free end $e$ projecting through the aperture Q of the twister-wheel and into the acute-angled bearing $i$ at the upper end of the bifurcation I. The operator then takes hold of the handle A and engages the machine with the fence by entering the fence-wire through the slot J and the bifurcation I, securing the free end $e$ from turning by forcing it in its bearing $i$ against the fence-wire. The crank G is now turned, which imparts a rotary motion to the twister-wheel, carrying the spool around and twisting the stay-wire about the fence-wire. When the desired number of turns are made, the machine is disengaged from the first wire and engages with the next adjoining one, and the operation is repeated and so on to the bottom wire, the stay being thus twisted successively upon each of the fence-wires from top to bottom or bottom to top.

I find in practice that this makes a very simple machine adapted to quickly attach the stay-wires to the fence-wires with proper tension and with great rapidity, and that the same machine by simply adjusting the screw or pin to the central aperture in the twister may be used for spooling the wire.

What I claim as my invention is—

1. The combination in a fence-machine, with the frame and drive mechanism, of a combined twister-wheel and winder-wheel, a spool, and means for removably securing the spool centrally of said twister-wheel.

2. The combination in a fence-machine, with the frame and drive mechanism, of a combined twister-wheel and winder-wheel, a spool, and means for removably securing the spool centrally and eccentrically of said twister-wheel.

3. In a fence-machine, the combination of a handle, a slotted twister-wheel having actuating-gear, an eccentrically-arranged wire bearing in the twister-wheel, and a forked arm extending from the handle and adapted to engage the stay-wire and the longitudinal wire beside the twister-wheel, substantially as described.

4. In a fence-machine of the kind described, the combination of the handle or frame, the twister-wheel journaled therein having an entering-slot, a central aperture, and a wire bearing or aperture, of a spool having means for securing it centrally or eccentrically to said twister-wheel for the purpose described.

5. In a fence-machine of the kind described, the combination of a twister-wheel having an entering-slot, a central aperture, and an eccentric aperture $d$ with a connecting-groove on one face of the wheel, of the hook-bolt L adapted to engage in one of said apertures with the hook in the groove, and the sleeve M adapted to be clamped by the bolt on the twister-wheel, substantially as described.

In testimony whereof I affix my signature in presence of two witnesses.

JOHN A. THREEHOUSE.

Witnesses:
  M. B. O'DOGHERTY,
  OTTO F. BARTHEL.